(12) United States Patent
Pennock et al.

(10) Patent No.: US 6,772,170 B2
(45) Date of Patent: *Aug. 3, 2004

(54) SYSTEM AND METHOD FOR INTERPRETING DOCUMENT CONTENTS

(75) Inventors: Kelly A. Pennock, Richland, WA (US); Nancy E. Miller, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/298,361

(22) Filed: Nov. 16, 2002

(65) Prior Publication Data

US 2003/0097375 A1 May 22, 2003

Related U.S. Application Data

(63) Continuation of application No. 09/455,849, filed on Dec. 7, 1999, now Pat. No. 6,484,168, and a continuation of application No. 09/191,004, filed on Nov. 12, 1998, now abandoned, and a continuation of application No. 08/713,313, filed on Sep. 13, 1996, now abandoned.

(51) Int. Cl.[7] .............................................. G06F 17/00
(52) U.S. Cl. ............................... 707/102; 707/3; 707/5; 707/6; 707/10; 707/101
(58) Field of Search .......................... 707/6, 5, 3, 10, 707/101, 102; 715/531, 500, 542, 532

(56) References Cited

U.S. PATENT DOCUMENTS

| | | | | |
|---|---|---|---|---|
| 3,609,703 A | * | 9/1971 | Peacock ................... 340/146.2 |
| 3,662,400 A | | 5/1972 | Geil ............................... 707/1 |
| 3,940,601 A | | 2/1976 | Henry et al. ................ 714/735 |
| 4,849,898 A | * | 7/1989 | Adi ................................ 707/5 |
| 4,862,412 A | | 8/1989 | Fried et al. .................... 365/49 |
| 5,228,133 A | | 7/1993 | Oppedahl ....................... 707/6 |
| 5,333,313 A | * | 7/1994 | Heising .......................... 707/1 |
| 5,369,577 A | * | 11/1994 | Kadashevich et al. ......... 704/9 |
| 5,377,348 A | | 12/1994 | Lau et al. ....................... 707/3 |
| 5,381,454 A | * | 1/1995 | Nusinov et al. .............. 377/39 |
| 5,396,588 A | | 3/1995 | Froessl ....................... 715/542 |
| 5,423,032 A | | 6/1995 | Byrd et al. ..................... 707/5 |
| 5,499,382 A | * | 3/1996 | Nusinov et al. ............ 712/210 |
| 5,576,954 A | * | 11/1996 | Driscoll ......................... 707/3 |
| 5,604,901 A | | 2/1997 | Kelley et al. ................... 707/3 |
| 5,619,709 A | | 4/1997 | Caid et al. ................... 715/532 |
| 5,659,730 A | * | 8/1997 | Kelley et al. ................... 707/3 |
| 5,675,819 A | | 10/1997 | Schuetze ..................... 704/10 |
| 5,689,716 A | * | 11/1997 | Chen .......................... 715/500 |
| 5,708,829 A | | 1/1998 | Kadashevich et al. ....... 715/531 |
| 5,745,893 A | | 4/1998 | Hill et al. ....................... 707/5 |
| 5,751,862 A | | 5/1998 | Williams et al. ............ 382/260 |
| 5,950,189 A | * | 9/1999 | Cohen et al. ................... 707/3 |
| 6,026,388 A | * | 2/2000 | Liddy et al. .................... 707/1 |

OTHER PUBLICATIONS

Fabrikant; "Evaluating the usability of the Scale Metaphor for Querying Semantic Spaces" http://citeseer.nj.nec.com/515847.html.
Skupin; "Cartographic Considerations for Map–Like Interfaces to Digital Libraries" http://citeseer.nj.nec.com/442706.html.
Ultsch, et al; "Knowledge Extraction from Artificial Neural Networks and Applications"; Proc. Transputer Anwender Treffen/World Transputer Congress TAT/WTC 93 Aachen, Springer 1993.
Lin, et al; "The TV–tree–an index Structure for high–dimensional data"; http://citeseer.nj.nec.com/lin94tvtree.html.
Demchenko: "Recent developments in Indexing, Searching and Information Retrieval" http://www.iihe.ac.be/scimitar/J0799/1sir.html.
Carey, et al; "A Visualization Interface for Document Searching and Browsing" http://citeseer.nj.nec.com/382997.html.
Caid, et al; "Learned Vector–Space Models for Document Retrieval"; http://citeseer.nj.nec.com/7470.html.
Dumais; "Latent Semantic Indexing (LSI): TREC–3 Report" http://citeseer.nj.nec.com/431.html.
Kirac, et al; "Results on Lattice Vector Quantization with Dithering"; IEEE, 1996, pp. 811–825.

* cited by examiner

Primary Examiner—Thuy N. Pardo
(74) Attorney, Agent, or Firm—Milde & Hoffberg LLP

(57) ABSTRACT

A sequence of word filters are used to eliminate terms in the database which do not discriminate document content, resulting in a filtered word set and a topic word set whose members are highly predictive of content. These two word sets are then formed into a two dimensional matrix with matrix entries calculated as the conditional probability that a document will contain a word in a row given that it contains the word in a column. The matrix representation allows the resultant vectors to be utilized to interpret document contents.

15 Claims, No Drawings

SYSTEM AND METHOD FOR INTERPRETING DOCUMENT CONTENTS

This application is a continuation of application Ser. No. 09/455,849 filed on Dec. 7, 1999 now Pat. No. 6,484,168, a continuation of application Ser. No. 09/191,004 filed on Nov. 12, 1998 now abandoned, continuation of application Ser. No. 08/713,313 filed on Sep. 13, 1996 now abandoned, hereby incorporated by reference in their entirety.

FIELD OF THE INVENTION

The present invention relates generally to a method for automatically analyzing and characterizing the content of electronically formatted natural language based documents.

BACKGROUND OF THE INVENTION

As the global economy has become increasingly driven by the skillful synthesis of information across all disciplines, be they scientific, economic, or otherwise, the sheer volume of information available for use in such a synthesis has rapidly expanded. This has resulted in an ever increasing value for systems or methods which are able to analyze information and separate information relevant to a particular problem or useful in a particular inquiry from information that is not relevant or useful. The vast majority of information available for such synthesis, 95% according to estimates by the National Institute for Science and Technology (NIST), is in the form of written natural language. The traditional method of analyzing and characterizing information in the form of written natural language is to simply read it. However, this approach is increasingly unsatisfactory as the sheer volume of information outpaces the time available for manual review. Thus, several methodologies for automating the analysis and characterization of such information have arisen. Typical for such schemes is the requirement that the information is presented, or converted, to an electronic form or database, thereby allowing the database to be manipulated by a computer system according to a variety of algorithms designed to analyze and/or characterize the information available in the database. For example, vector based systems using first order statistics have been developed which attempt to define relationships between documents based upon simple characteristics of the documents, such as word counts.

The simplest of these methodologies is a simple search wherein a word or a word form is entered into the computer as a query and the computer compares the query to words contained in the documents in the database to determine if matches exist. If there are matches, the computer then returns a list of those documents within the database which contain a word or word form which matches the query. This simple search methodology may be expanded by the addition of other Boolean operators into the query. For example, the computer may be asked to search for documents which contain both a first query and a second query, or a second query within a predetermined number of words from the first query, or for documents containing a query which consist of a series of terms, of for documents which contain a particular query but not another query. Whatever the particular parameters, the computer searches the database for documents which fit the required parameters, and those documents are then returned to the user.

Among the drawbacks of such schemes is the possibility that in a large database, even a very specific query may match a number of documents that is too large to be effectively reviewed by the user. Additionally, given any particular query, there exists the possibility that documents which would be relevant to the user may be overlooked because the documents do not contain the specific query term identified by the user; in other words, these systems often ignore word to word relationships, and thus require exacting queries to insure meaningful search results. Because these systems tend to require exacting queries, these methods suffer from the drawback that the user must have some concept of the contents of the documents in order to draft a query which will generate the desired results. This presents the users of such systems with a fundamental paradox: In order to become familiar with a database, the user must ask the right questions or enter relevant queries; however, to ask the right questions or enter relevant queries, the user must already be familiar with the database.

To overcome these and other drawbacks, a number of methods have arisen which are intended to compare the contents of documents in an electronic database and thereby determine relationships between the documents. In this manner, documents that address similar subject matter but do not share common key words may be linked, and queries to the database are able to generate resulting relevant documents without requiring exacting specificity in the query parameters. For example, vector based systems using higher order statistics may be characterized by the generation of vectors which can be used to compare documents. By measuring conditional probabilities between and among words contained within the database, different terms may be linked together. However, these systems suffer from the drawback that they are unable to discern words which provide insight into the meaning of the documents which contain them. Other systems have sought to overcome this limitation by utilizing neural networks or other methods to capture the higher order statistics required to compress the vector space. These systems suffer from considerable computational lag due to the large amount of information that they are processing. Thus, there exists a need for an automated system which will analyze and characterize a database of electronically formatted natural language based documents in a manner wherein the system output correlates documents within the database according to the meaning of the documents and required system resources are minimized.

SUMMARY OF THE INVENTION

Accordingly, the present invention is a System for Information Discovery (SID). The overriding intent of the present invention is to provide a system for analyzing and characterizing a database of electronically formatted natural language based documents wherein the output is information concerning the content and structure of the underlying database in a form that correlates the meaning of the individual documents within the database. A sequence of word filters are used to eliminate terms in the database which do not discriminate document content, resulting in a filtered word set whose members are highly predictive of content. The filtered word set is then further reduced to determine a subset of topic words which are characterized as the set of filtered words which best discriminate the content of the documents which contain them. These two word sets, the filtered word set and the topic set, are then formed into a two dimensional matrix. Matrix entries are then calculated as the conditional probability that a document will contain a word in a row given that it contains the word in the column of the matrix. The number of word correlations which is computed is thus significantly reduced because each word in the filtered set is only related to the topic words, with the topic word set being smaller than the filtered word set. The matrix representation thus captures the context of the filtered words and allows the resultant vectors to be utilized to interpret document contents with a wide variety of querying schemes. Surprisingly, while computational efficiency gains are realized by utilizing the reduced topic word set (as compared with creating a matrix with only the filtered word set forming both the columns and the rows), the ability of the resultant vectors to predict content is comparable or superior to approaches which consider word sets which have not been reduced either in the number of terms considered or by the number of correlations between terms.

The first step of the system is to compress the vocabulary of the database through a series of filters. Three filters are employed, the frequency filter, the topicality filter and the overlap filter. The frequency filter first measures the absolute number of occurrences of each of the words in the database and eliminates those which fall outside of a predetermined upper and lower frequency range.

The topicality filter then compares the placement of each word within the database with the expected placement assuming the word was randomly distributed throughout the database. By expressing the ratio between a value representing the actual placement of a given word (A) and a value representing the expected placement of the word assuming random placement (E), a cutoff value may be established wherein words whose ratio A/E is above a certain predefined limit are discarded. In this manner, words which do not rise to a certain level of nonrandomness, and thus do not represent topics, are discarded.

The overlap filter then uses second order statistics to compare the remaining words to determine words whose placement in the database are highly correlated with one and another. Measures of joint distribution are calculated for word pairs remaining in the database using standard second order statistical methodologies, and for word pairs which exhibit correlation coefficients above a preset value, one of the words of the word pair is then discarded as its content is assumed to be captured by its remaining word pair member.

At the conclusion of these three filtering steps, the number of words in the database is typically reduced to approximately ten percent of the original number. In addition, the filters have discriminated and removed words which are not highly related to the topicality of the documents which contain them, or words which are redundant to words which reveal the topicality of the documents which contain them. The remaining words, which are thus highly indicative of topicality and non-redundant, are then ranked according to some predetermined criteria designed to weight them according to their inherent indicia of content. For example, they may be ranked in descending order of their frequency in the database, or according to ascending order according to their rank in the topicality filter.

The filtered words thus ranked are then cut off at either a predetermined limit or a limit generated by some parameter relevant to the database or its characteristics to create a reduced subset of the total population of filtered words. This subset is referred to as a topic set, and may be utilized as both an index and/or as a table of contents. Because the words contained in the topic set have been carefully screened to include those words which are the most representative of the contents of the documents contained within the database, the topic set allows the end user the ability to quickly surmise both the primary contents and the primary characteristics of the database.

This topic set is then utilized as rows and the filtered words are utilized as columns in a matrix wherein each of the elements of the columns and the rows are evaluated according to their conditional probability as word pairs. The resultant matrix evaluates the conditional probability of each member of the topic set being present in a document, or a predetermined segment of the database which can represent a document, given the presence of each member of the filtered word set. The resultant matrix can be manipulated to characterize documents within the database according to their context. For example, by summing the vectors of each word in a document also present in the topic set, a unique vector for each document which measures the relationships between the document and the remainder of the database across all the parameters expressed in the topic set may be generated. By comparing vectors so generated for any set of documents contained within the data set, the documents be compared for the similarity of the resultant vectors to determine the relationship between the contents of the documents. In this manner, all of the documents contained within the database may be compared to one and another based upon their content as measured across a wide spectrum of indicating words so that documents describing similar topics are correlated by their resultant vectors.

OBJECTS

The subject matter of the present invention is particularly pointed out and distinctly claimed in the concluding portion of this specification. However, both the organization and method of operation, together with further advantages and objects thereof, may best be understood by reference to the following description.

DESCRIPTION OF THE PREFERRED EMBODIMENT(S)

In a preferred embodiment of the present invention, the System for Information Discovery (SID) is provided as a series of instructions provided as a code for a programmable computer. The particular programming language selected is not critical, any language which will accomplish the required instructions necessary to practice the method is suitable. As an example, a prototype program of SID was written in C++. Similarly, the particular computer platform selected for running the code which performs the series of instructions is not critical. Any computer platform with sufficient system resources such as memory to run the resultant program is suitable. The prototype program of SID described above has been run on a variety of systems including a Silicon Graphics Indy workstation, a Sun Sparc 2 system, a Sun Sparc 10 system, and a Sun Sparc 20 system. The database that is to be interrogated is a series of documents written in some natural language. While the prototype system has primarily been tested with documents written in English, the methodology of SID will work for any language, particularly those which utilize a Roman alphabet, which may be represented in a written form. The documents must be converted into an electronic form to be loaded into the database. As will be apparent to those skilled in the art, this may be accomplished by a variety of methods.

In the first step of the preferred embodiment, the individual words contained within the database are examined to create a filtered word set comprising about 15% of the words contained in the database. The filtered word set is then further reduced to produce a topic set comprising about 15% of the words in the filtered word set. The filtered word set is produced by sending the database through a series of three filters, the frequency filter, the topicality filter and the overlap filter.

The frequency filter first measures the absolute number of occurrences of each of the words in the database and eliminates those which fall outside of a predetermined upper and lower frequency range. In the preferred embodiment, the upper range was set to exclude words which occur in more than 20% of the documents, and the lower range was set to exclude words which occur in fewer than 1% of the documents, for documents sets of one hundred or more. Those words that are outside of these ranges remain in the database, but are discarded from the filtered word set.

The remaining words are then sent through the topicality filter which compares the placement of each word within the database with the expected placement assuming the word was randomly distributed throughout the database. Algorithmically, a rapid method to identify important topics at the proper "sampling rate" is essential. The approach followed in the preferred embodiment for topic filtering is based on the serial clustering work described in Detecting Content-Bearing Words by Serial Clustering, Bookstein, A., Klein, S. T., Raita, T. (1995) *Proceedings of the 15th Annual International ACM SIGIR Conference on Research and Development in Information Retrieval*: 319–327. and incorporated herein by reference. The preferred method greatly simplifies the serial clustering as described in Bookstein et al by approximating the size of the text unit with the average size of the document, and then assuming uniform distribution of each word within the document so that word counts in documents which are larger than average are scaled down and word counts in documents which are smaller than average are scaled up. For example, the count for a particular word for a document which contains m * the average number of total words, and a count n of a particular word, is scaled by a factor of 1/m. This approximation avoids the computationally expensive text unit divisions identified in Bookstein et al.

The concept can be understood by considering the placement of points within a grid of cells. Given m points randomly distributed on n cells, some cells can be expected to contain zero points, others one, etc. Numerically, condensation clustering is the ratio between the actual number of occurrences of a term within a text unit (document or subdocument unit) of arbitrary size, to the expected number of occurrences, and is given by:

Condensation Clustering Value=$A(t_a)/E(t_a)$ with $E(t_a)=U[1-(1-1/U)^T]$ and with U=# documents in the corpus, and T=# occurrences of token $t_a$ in the database.

Thus, topic words, or words that represent subject, are characterized by their condensation clustering value. In the preferred embodiment, words having a condensation clustering value of less than 1.0 are selected for inclusion in the filtered word set.

In the preferred embodiment, the remaining words are then sent through the overlap filter. The overlap filter uses second order statistics to compare the remaining words to determine words whose placement in the database are highly correlated with one and another. Many measures of joint distribution are known to those skilled in the art, and each is suitable for determining values which are then used by the overlap filter. In the preferred embodiment, conditional probabilities are utilized to represent the relationship between words, so that the relationship between term a and term b is given by:

$P(t_j/t_i)$=the conditional probability of $t_i$ given $t_j$

Word pairs which are closely correlated may have one of their members discarded as only the remaining member is necessary to signify the content of the word pair. Thus, for word pairs having a correlation above a preset value, 0.4 for the preferred embodiment, the overlap filter will discard the lower topicality word of the pair, as its content is assumed to be captured by its remaining word pair member.

After the overlap filter has eliminated redundant words, the final set of filtered words is complete. The preferred embodiment then ranks these filtered words in descending order according to their frequency in the database. The words with a topicality value below a predefined threshold, for the preferred embodiment 0.8, are then selected to comprise the topic set. The words that comprise the topic set and the filtered word set may be displayed to the user as they are extremely useful in and of themselves for communicating the general content of the dataset. In short, at this juncture, the preferred embodiment has provided a listing of key terms which are readily interpreted by humans and which are highly representative of the underlying topicality of the dataset. This topic set is then utilized as rows and the filtered words are utilized as columns in a matrix wherein each of the elements of the columns and the rows are evaluated according to their conditional probability as word pairs. The matrix is described as two sets of words: the topic words (n) and the filtered words, or (m). An n by m matrix is then computed, with the entries in the matrix being the conditional probabilities of occupance, modified by the independent probability of occurrence, or $$M_{ij}=P(t_j/t_i)-\text{Beta}*P(t_j)$$

with $M_{ij}$=the ith row, jth column of the conditional probability matrix $P(t_j/t_i)$=the conditional probability of $t_i$ given tj $P(t_j)$=the probability of tj Beta=parameter constant to ensure strong correlations The end product is a list of associations among discriminating words in the data set using only second order statistics. An advantage derived from the exclusive use of second order statistics and smaller word sets in the preferred embodiment is greatly reduced computational time, memory, and the capacity for incremental updates.

The preferred embodiment then utilizes a vector space model for content characterization for two primary reasons. First, to measure the degree of match between documents and a query, the vector space model can be very efficient. For natural language-based queries or extended Boolean queries, the vector-space model allows documents to be ranked from top to bottom using a simple dot product. Queries, in this model, are simply vectors in the vector space, the same as any unit of text (from a single word to a document or even multiple documents). The second primary reason for the vector space model is that it provides a spatial representation for information. The representation conveys significant structural information which is important to many operations such as grouping or clustering or projecting.

A number of functions such as advanced query operations and visualization depend on meaningfully distinguishing documents in vector space due to content. The preferred embodiment capitalizes on the tendency that the greater the differences in content, the more distinct the vector characterization of the documents. In the preferred embodiment, topics words serve as dimensions in the vector-space model. Given that the major topics of a data set have been defined using the described filtering techniques, and that the essential vocabulary of the data set have been probabilistically linked to the topics, the general goal of document content characterization is to map the specific document contents to varying values for each of the topics in the canonical set. Just as functions can be defined by combinations of sinusoids, so SID documents are defined by combinations of topic values. The contents of each document are then judged strongly related to those topics for which relatively large values are calculated. An important advantage of this method is that topics of interest can easily be enhanced or diminished through linear transforms on the topic magnitudes across the document set. This permits users to define spatial relationships among documents based on their interests, instead of a single predefined representation. The limitless combinations of topics and values thus allows a rich method of content characterization in the preferred embodiment.

The construction of the document vectors in the preferred embodiment is a relatively straight-forward process. For each document in the data set, four steps are followed to produce the vector:

1) words of interest are determined (the topic words contained in the document)
2) a vector for each word of interest in the document is extracted from the modified conditional probability matrix (e.g. if the first word of interest is entry n in the conditional probability matrix, the corresponding vector is the nth column of the matrix, with each row of that vector the modified conditional probability associating the word of interest with each topic)
3) the vectors for each word of interest are summed, and
4) the final vector summation is normalized so that the summation of all component magnitudes is one.

In the preferred embodiment, efficient indexing or hashing makes the vector construction process rapid. Interim representations of documents that were originally created when the documents were initially parsed to provide an index of terms, contain words and their associated counts in the document, minus stop words and after stemming. The interim structure is much smaller and therefore more efficient to search for topics. The vector construction is also extremely flexible in the scale of its application. Short and long documents, document components such as chapters, or paragraphs, or even single words, or user queries ranging from strict Boolean queries to natural language queries, each have vectors constructed in the same manner. Document discrimination is thus a derived property of the vector-space representation. Representations that proximally locate documents of similar theme and separate documents which are significantly dissimilar in theme are capable of appropriate discrimination based on the resultant vectors generated.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method, comprising the steps of:
   a) semantically filtering a set of documents in a database to extract a set of semantic concepts, to improve an efficiency of a predictive relationship to its content, based on at least one of word frequency, overlap and topicality;
   b) defining a topic set, said topic set being characterized as the set of semantic concepts which best discriminate the content of the documents containing them, said topic set being defined based on at least one of word frequency, overlap and topicality;
   c) forming a matrix with the semantic concepts contained within the topic set defining one dimension of said matrix and the semantic concepts contained within the filtered set of documents comprising another dimension of said matrix;
   d) calculating matrix entries as the conditional probability that a document in the database will contain each semantic concept in the topic set given that it contains each semantic concept in the filtered set of documents; and
   e) providing said matrix entries as vectors to interpret the document contents of said database.

2. The method of claims 1, wherein said semantic concepts comprise words.

3. The method of claim 1, wherein said semantic concepts comprise word sets.

4. The method of claim 1, wherein said filtering comprises determining correlations of semantic concepts.

5. The method of claim 1, wherein said semantically filtering results in a set of documents represented by approximately 10% of an original number of words.

6. The method of claim 1, further comprising the step of ranking the filtered semantic concepts according to predetermined criteria.

7. The method of claim 6, further comprising the step of truncating the ranked filtered semantic concepts according to a cut off, to form the topic set.

8. The method of claim 6, wherein the predetermined criteria of said ranking substep comprises weighting words according to their inherent indicia of content.

9. The method of claim 1, wherein said defining step further comprises the substep of ranking the extracted semantic concepts according to their frequency in the database.

10. The method of claim 1, wherein said defining further comprises the substep of ranking the extracted semantic concepts according to their rank in the topicality filter.

11. The method of claim 1, wherein said defining step further comprises the substep of ranking the extracted semantic concepts, and truncating semantic concepts having a relatively lower rank.

12. A computer readable software medium containing computer software for controlling a general purpose computer to perform the method of claim 1.

13. A computer readable software medium containing computer software for controlling a general purpose computer to perform the method of claim 1.

14. A system, comprising:
   a) a filter for semantically filtering a set of documents in a database to extract a set of semantic concepts, to improve an efficiency of a predictive relationship to its content;
   b) means for defining a topic set, said topic set being characterized as the set of semantic concepts which best discriminate the content of the documents containing them, said topic set being defined based on at least one of word frequency, overlap and topicality;
   c) a matrix, with the semantic concepts contained within the topic set defining one dimension of said matrix and the semantic concepts contained within the filtered set of documents comprising another dimension of said matrix, wherein matrix entries are calculated as the conditional probability that a document in the database will contain each semantic concept in the topic set given that it contains each semantic concept in the filtered set of documents; and e) means for interpreting the document contents of said database based on vectors derived from said matrix.

15. The system of claim 14, wherein said filter comprises a correlator for filtering semantic concepts, said filtered semantic concepts being topically ranked and truncated to form said topic set.

* * * * *